United States Patent
van Tooren et al.

(10) Patent No.: US 12,485,623 B2
(45) Date of Patent: Dec. 2, 2025

(54) INDUCTION WELDING THERMOPLASTIC MATERIAL WITH DIFFERENT ELECTRICAL CONDUCTIVITIES

(71) Applicant: Rohr, Inc., Chula Vista, CA (US)

(72) Inventors: Michael van Tooren, San Diego, CA (US); Chris Croshaw, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 164 days.

(21) Appl. No.: 18/228,367

(22) Filed: Jul. 31, 2023

(65) Prior Publication Data

US 2025/0042097 A1    Feb. 6, 2025

(51) Int. Cl.
- *B29C 65/32* (2006.01)
- *B29C 70/88* (2006.01)
- *B29C 35/08* (2006.01)
- *B29K 307/04* (2006.01)
- *B29L 31/30* (2006.01)

(52) U.S. Cl.
CPC ............ *B29C 65/32* (2013.01); *B29C 70/882* (2013.01); *B29C 2035/0816* (2013.01); *B29K 2307/04* (2013.01); *B29K 2995/0005* (2013.01); *B29L 2031/3076* (2013.01)

(58) Field of Classification Search
CPC ............................... B29C 65/32; B29C 70/882
See application file for complete search history.

(56) References Cited

U.S. PATENT DOCUMENTS

| | | |
|---|---|---|
| 5,500,511 A | 3/1996 | Hansen |
| 5,645,744 A | 7/1997 | Matsen |
| 11,571,861 B2 | 2/2023 | Wadsworth |
| 2014/0190629 A1 | 7/2014 | Benson |
| 2021/0001567 A1 | 1/2021 | Ogale |
| 2021/0170699 A1 | 6/2021 | Kamo |

(Continued)

FOREIGN PATENT DOCUMENTS

| | | | |
|---|---|---|---|
| KR | 10-2009-0119914 A | * | 11/2009 |
| WO | WO-2017/064646 A1 | * | 4/2017 |
| WO | WO-2020/129007 A1 | * | 6/2020 |

OTHER PUBLICATIONS

Lundström, Fredrik, et al. "Induction heating of carbon fiber composites: Investigation of electrical and thermal properties." International Journal of Applied Electromagnetics and Mechanics 53.1_suppl (2017): S21-S30.*

(Continued)

*Primary Examiner* — Jeffry H Aftergut
(74) *Attorney, Agent, or Firm* — Getz Balich LLC

(57) ABSTRACT

A method is provided during which a first thermoplastic body is provided. The first thermoplastic body includes first fiber-reinforcement with a first electrical conductivity. A second thermoplastic body is provided. The second thermoplastic body includes second fiber-reinforcement with a second electrical conductivity that is greater than the first electrical conductivity. The second thermoplastic body is arranged with the first thermoplastic body. The second thermoplastic body is induction welded to the first thermoplastic body using an induction welding coil. The second thermoplastic body is arranged between the first thermoplastic body and the induction welding coil.

14 Claims, 7 Drawing Sheets

(56) References Cited

U.S. PATENT DOCUMENTS

2023/0356320 A1   11/2023   Frogner

OTHER PUBLICATIONS

Eddib, Asma A., and D. D. L. Chung. "Electric permittivity of carbon fiber." Carbon 143 (2019): 475-480.*
Bard, Simon, et al. "Copper and nickel coating of carbon fiber for thermally and electrically conductive fiber reinforced composites." Polymers 11.5 (2019): 823.*
EP Search Report for EP Patent Application No. 24192197.2 dated Nov. 15, 2024.

* cited by examiner

INDUCTION WELDING THERMOPLASTIC MATERIAL WITH DIFFERENT ELECTRICAL CONDUCTIVITIES

BACKGROUND

1. Technical Field

This disclosure relates generally to welding methods and, more particularly, to welding thermoplastic material.

2. Background Information

Various systems and methods are known in the art for welding thermoplastic materials. While these known welding systems and methods have various benefits, there is still room in the art for improvement.

SUMMARY OF THE DISCLOSURE

According to an aspect of the present disclosure, a method is provided. During this method, a first thermoplastic body is provided. The first thermoplastic body includes first fiber-reinforcement with a first electrical conductivity. A second thermoplastic body is provided. The second thermoplastic body includes second fiber-reinforcement with a second electrical conductivity that is greater than the first electrical conductivity. The second thermoplastic body is arranged with the first thermoplastic body. The second thermoplastic body is induction welded to the first thermoplastic body using an induction welding coil. The second thermoplastic body is arranged between the first thermoplastic body and the induction welding coil.

According to another aspect of the present disclosure, another method is provided. During this method, a first thermoplastic body is provided. The first thermoplastic body includes a first thermoplastic matrix and a plurality of first carbon fibers embedded within the first thermoplastic matrix. The first carbon fibers have a first electrical conductivity. A second thermoplastic body is provided. The second thermoplastic body includes a second thermoplastic matrix and a plurality of second carbon fibers embedded within the second thermoplastic matrix. The second carbon fibers have a second electrical conductivity which is greater than the first electrical conductivity. The second thermoplastic body is induction welded to the first thermoplastic body using an induction welding coil. The second thermoplastic body is located between the first thermoplastic body and the induction welding coil.

According to still another aspect of the present disclosure, another method is provided. During this method, a plurality of first fibers are provided with a first electrical conductivity. A first thermoplastic body is provided, where the providing of the first thermoplastic body includes embedding the first fibers within a first thermoplastic matrix. A plurality of second fibers are provided with a second electrical conductivity which is different than the first electrical conductivity. A second thermoplastic body is provided, where the providing of the second thermoplastic body includes embedding the plurality of second fibers within a second thermoplastic matrix. The second thermoplastic body is induction welded to the first thermoplastic body using an induction welding coil.

The second electrical conductivity may be greater than the first electrical conductivity. The second thermoplastic body may be arranged between the first thermoplastic body and the induction welding coil during the induction welding.

The method may also include: providing a plurality of carbon fibers formed from a common carbon material; treating a first set of the carbon fibers with a first treatment to provide the first fibers with the first electrical conductivity; and treating a second set of the carbon fibers with a second treatment to provide the second fibers with the second electrical conductivity.

One of the first fibers may include a first core and a first shell over the first core. One of the second fibers may include a second core and a second shell over the second core. The second core and the first core may be configured from or otherwise include a common material. The second shell may have a greater electrical conductivity than the first shell.

The first carbon fibers and the second carbon fibers may be configured from or otherwise include a common carbon material.

The first fiber-reinforcement may include a plurality of first fibers, and one of the first fibers may include a first core and a first shell over the first core. The second fiber-reinforcement may include a plurality of second fibers, and one of the second fibers may include a second core and a second shell over the second core. The second shell may have a greater electrical conductivity than the first shell.

The second core and the first core may have a common electrical conductivity.

The second core and the first core may be configured from or otherwise include a common material.

The first fiber-reinforcement may include a plurality of first fibers, and one of the first fibers may have the first electrical conductivity. The second fiber-reinforcement may include a plurality of second fibers, and one of the second fibers may have the second electrical conductivity.

One of the first fibers and the one of the second fibers may be configured from or otherwise include a common carbon material.

The method may include: treating a plurality of first fibers with a first treatment to provide the first fiber-reinforcement with the first electrical conductivity, and the providing of the first thermoplastic body comprising embedding the first fiber-reinforcement within a first thermoplastic matrix; and treating a plurality of second fibers with a second treatment to provide the second fiber-reinforcement with the second electrical conductivity, the second treatment different than the first treatment, and the providing of the second thermoplastic body comprising embedding the second fiber-reinforcement within a second thermoplastic matrix.

The first fibers and the second fibers may be formed by a common material.

The first treatment may be or otherwise include heating the first fibers at a first elevated temperature for a first period of time. The second treatment may be or otherwise include heating the second fibers at a second elevated temperature for a second period of time. The first elevated temperature may be different than the second elevated temperature, and/or the first period of time may be different than the second period of time.

The first treatment may be or otherwise include coating the first fibers with a first material. The second treatment may be or otherwise include coating the second fibers with a second material that is different than the first material.

The first fiber-reinforcement may include a plurality of first fibers, and one of the first fibers may be configured from or otherwise include a first material. The second fiber-reinforcement may include a plurality of second fibers, and one of the second fibers may be configured from or otherwise include a second material that is different than the first material.

The induction welding may include exciting a plurality of first fibers of the first fiber-reinforcement and a plurality of second fibers of the second fiber-reinforcement with eddy currents generated by the induction welding coil.

The first thermoplastic body may be configured as a support structure. The second thermoplastic body may be configured as a skin. The skin may be supported by and welded to the support structure following the induction welding.

The method may also include forming an aircraft component. The aircraft component may include the second thermoplastic body induction welded to the first thermoplastic body.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
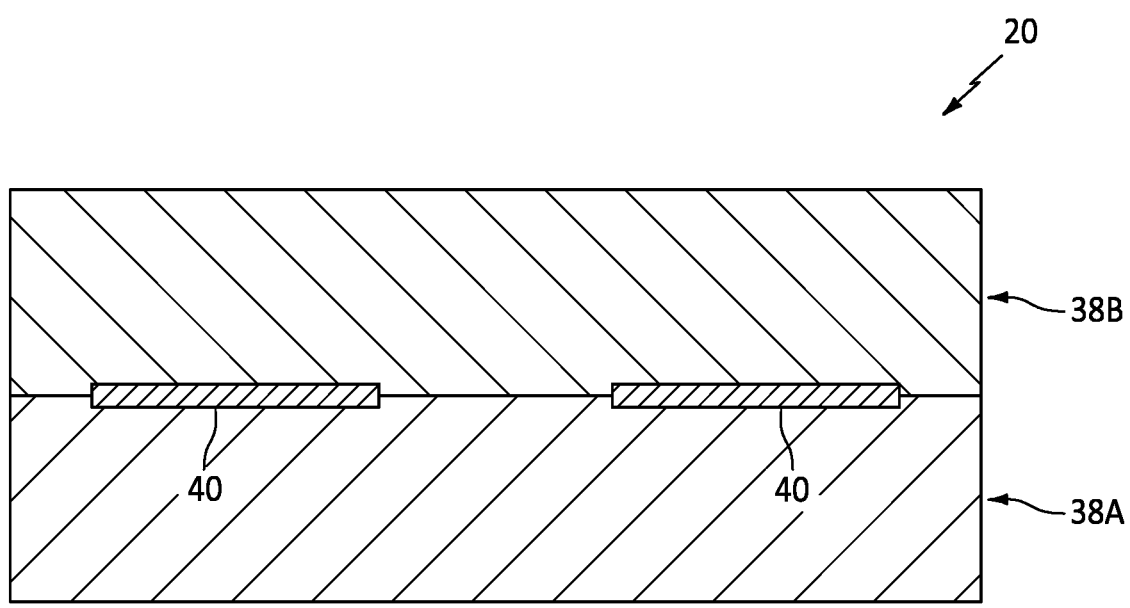
FIG. 1 is a partial schematic sectional illustration of a thermoplastic component.

The present disclosure includes methods and systems for manufacturing a thermoplastic component 20 (e.g., a thermoplastic composite component/a fiber-reinforced thermoplastic component) of an aircraft, where an exemplary section of the aircraft component 20 is shown in FIG. 1. The aircraft may be an airplane, a helicopter, a drone (e.g., an unmanned aerial vehicle (UAV)) or any other manned or unmanned aerial vehicle or system.

Figure 2:
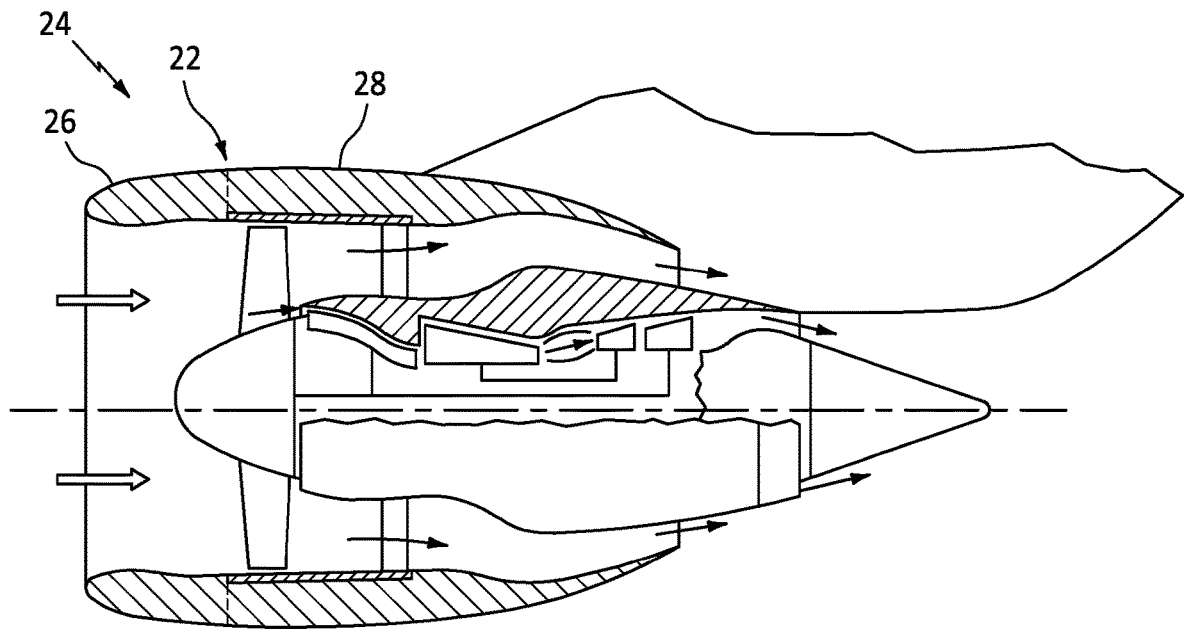
FIG. 2 is a cutaway schematic sectional illustration of an aircraft propulsion system which may include the thermoplastic component.
Figure 3:
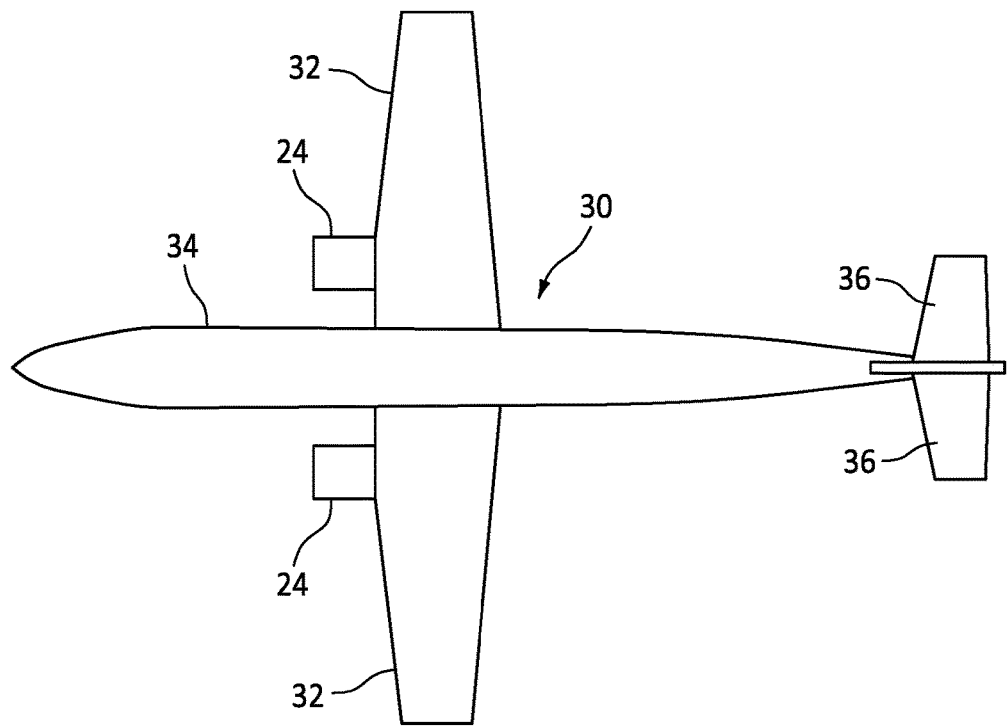
FIG. 3 is a schematic illustration of an aircraft with an airframe which may include the thermoplastic component.

Referring to FIG. 2, the aircraft component 20 may be configured as or otherwise included as part of a nacelle 22 of a propulsion system 24 for the aircraft. The aircraft component 20, for example, may be (or may be part of) a component of a nacelle inlet structure 26; e.g., a nacelle inlet lip (e.g., a nose lip), a nacelle outer barrel, a nacelle inner barrel, etc. In another example, the aircraft component 20 may be (or may be part of) another component of the propulsion system nacelle 22 such as a cowl 28 (e.g., a fan cowl), or the like. Referring to FIG. 3, the aircraft component 20 may alternatively be configured as or otherwise included as part of an airframe 30 of the aircraft. The aircraft component 20, for example, may be (or may be part of) an aircraft wing 32, an aircraft fuselage skin 34, an aircraft stabilizer 36, an aircraft control surface, or the like. The aircraft component 20 may still alternatively be configured as or otherwise included as part of a structure within the aircraft airframe 30; e.g., within a cabin of the aircraft. The present disclosure, however, is not limited to manufacturing the foregoing exemplary aircraft components. Moreover, it is contemplated the methods of the present disclosure may be utilized for manufacturing non-aircraft components. However, for ease of description, the thermoplastic component is generally described below as the aircraft component 20.

Referring again to FIG. 1, the aircraft component 20 includes at least (or only) a plurality of thermoplastic bodies 38A and 38B (generally referred to as "38"). These thermoplastic bodies 38 are induction welded together at one or more weld locations 40 to form the aircraft component 20.

Figure 4:
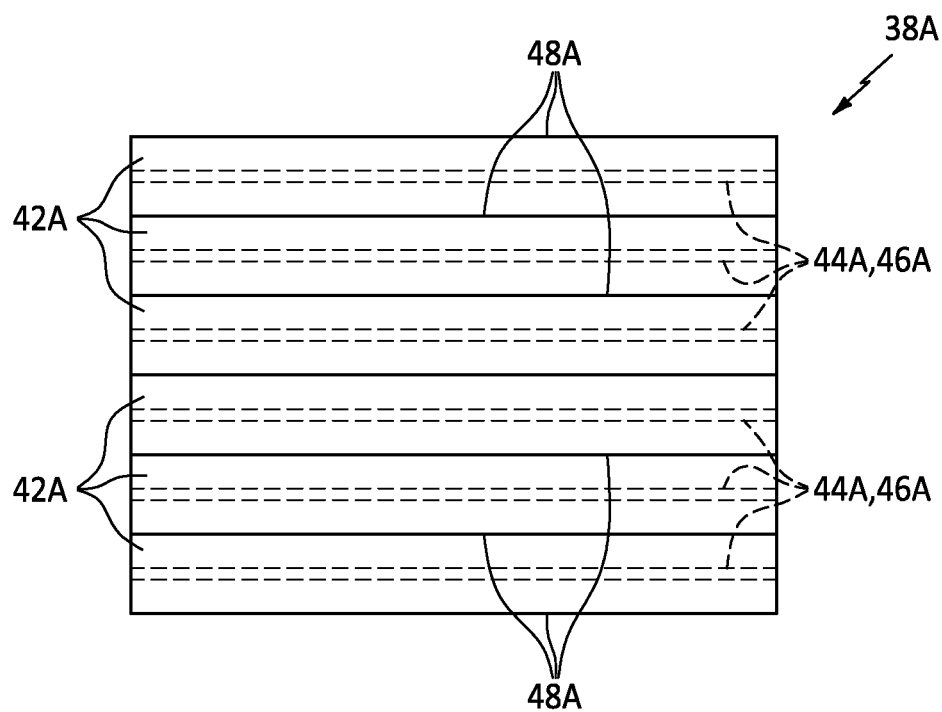
FIG. 4 is a partial schematic sectional illustration of layers in a first thermoplastic body.

Referring to FIG. 4, the first thermoplastic body 38A includes a first thermoplastic matrix 42A and first fiber-reinforcement 44A embedded within the first thermoplastic matrix 42A. The first thermoplastic matrix 42A may include a semi-crystalline thermoplastic material and/or an amorphous thermoplastic material. The first fiber-reinforcement 44A may include a plurality of first fibers 46A such as, but not limited to, carbon fibers (e.g., fibers of carbon fiber material). The first fiber-reinforcement 44A and its first fibers 46A may be arranged in one or more first body layers 48A within the first thermoplastic body 38A and its first thermoplastic matrix 42A. The first fibers 46A in each first body layer 48A of the first fiber-reinforcement 44A may be arranged in a unidirectional pattern. Alternatively, the first fibers 46A in one or more of the first body layers 48A of the first fiber-reinforcement 44A may be arranged in a multi-directional pattern; e.g., woven together in a weave. The first fibers 46A in each first body layer 48A of the first fiber-reinforcement 44A may include continuous fibers and/or chopped fibers. The present disclosure, however, is not limited to the foregoing exemplary fiber types and/or fiber arrangements.

The first fiber-reinforcement 44A of the first thermoplastic body 38A has an overall (e.g., average) first electrical conductivity. More particularly, each first fiber 46A in the first fiber-reinforcement 44A has an individual first electrical conductivity, where the individual first electrical conductivities of the first fibers 46A combine (e.g., average) to provide the first fiber-reinforcement 44A with its overall first electrical conductivity. The overall first electrical conductivity may be uniform (e.g., constant) throughout the first thermoplastic body 38A. The first fiber-reinforcement 44A of each first body layer 48A, for example, may have a common (the same) or substantially similar electrical conductivity throughout that respective first body layer 48A. Moreover, the first fibers 46A in each first body layer 48A may have common or substantially similar electrical conductivities. The present disclosure, however, is not limited to such an exemplary uniform electrical conductivity throughout the first thermoplastic body 38A and/or throughout each first body layer 48A. The overall first electrical conductivity, for example, may alternatively vary within the first thermoplastic body 38A and/or within one or more of the first body layers 48A. For example, one or more or all of the first body layers 48A may each include a blend of fibers 46A with different electrical conductivities. The fibers 46A in two or more of the first body layers 48A may also or alternatively have different electrical conductivities. The first fiber-reinforcement 44A in different first body layers 48A may thereby have different electrical conductivities. Of course, various other arrangements of inter-layer electrical conductivities and/or inter-fiber electrical conductivities within a respective first body layer 48A are possible.

Figure 5:
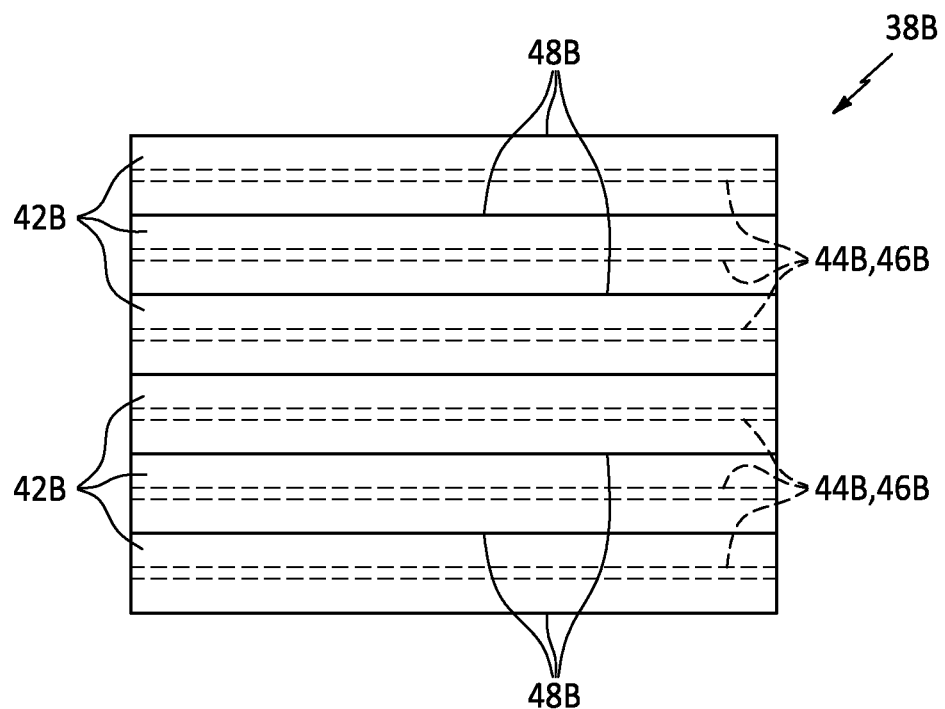
FIG. 5 is a partial schematic sectional illustration of layers in a second thermoplastic body.

Referring to FIG. 5, the second thermoplastic body 38B includes a second thermoplastic matrix 42B and second fiber-reinforcement 44B embedded within the second thermoplastic matrix 42B. The second thermoplastic matrix 42B may include a semi-crystalline thermoplastic material and/or an amorphous thermoplastic material. The second fiber-reinforcement 44B may include a plurality of second fibers 46B such as, but not limited to, carbon fibers (e.g., fibers of carbon fiber material). The second fiber-reinforcement 44B and its second fibers 46B may be arranged in one or more second body layers 48B within the second thermoplastic body 38B and its second thermoplastic matrix 42B. The second fibers 46B in each second body layer 48B of the second fiber-reinforcement 44B may be arranged in a uni-directional pattern. Alternatively, the second fibers 46B in one or more of the second body layers 48B of the second fiber-reinforcement 44B may be arranged in a multi-directional pattern; e.g., woven together in a weave. The second fibers 46B in each second body layer 48B of the second fiber-reinforcement 44B may include continuous fibers and/or chopped fibers. The present disclosure, however, is not limited to the foregoing exemplary fiber types and/or fiber arrangements.

The second fiber-reinforcement 44B of the second thermoplastic body 38B has an overall (e.g., average) second electrical conductivity. More particularly, each second fiber 46B in the second fiber-reinforcement 44B has an individual second electrical conductivity, where the individual second electrical conductivities of the second fibers 46B combine (e.g., average) to provide the second fiber-reinforcement 44B with its overall second electrical conductivity. The overall second electrical conductivity may be uniform (e.g., constant) throughout the second thermoplastic body 38B. The second fiber-reinforcement 44B of each second body layer 48B, for example, may have a common (the same) or substantially similar electrical conductivity throughout that respective second body layer 48B. Moreover, the second fibers 46B in each second body layer 48B may have common or substantially similar electrical conductivities. The present disclosure, however, is not limited to such an exemplary uniform electrical conductivity throughout the second thermoplastic body 38B and/or throughout each second body layer 48B. The overall second electrical conductivity, for example, may alternatively vary within the second thermoplastic body 38B and/or within one or more of the second body layers 48B. For example, one or more or all of the second body layers 48B may each include a blend of fibers 46B with different electrical conductivities. The fibers 46B in two or more of the second body layers 48B may also or alternatively have different electrical conductivities. The second fiber-reinforcement 44B in different second body layers 48B may thereby have different electrical conductivities. Of course, various other arrangements of inter-layer electrical conductivities and/or inter-fiber electrical conductivities within a respective second body layer 48B are possible.

Referring to FIGS. 4 and 5, the first and the second fiber-reinforcements 44A and 44B (generally referred to as "44") may be configured such than the overall second electrical conductivity is different than the overall first electrical conductivity. The overall second electrical conductivity of the second fiber-reinforcement 44B in the second thermoplastic body 38B, for example, may be greater than the overall first electrical conductivity of the first fiber-reinforcement 44A in the first thermoplastic body 38A. For example, the individual electrical conductivity of each second fiber 46B (or an average electrical conductivity of the second fibers 46B) may be greater than the individual electrical conductivity of each first fiber 46A (or an average electrical conductivity of the first fibers 46A).

The electrical conductivity of the fibers 46A, 46B (generally referred to as "46") and, thus, the respective fiber-reinforcement 44A, 44B which includes the fibers 46 may be tailored using various techniques. For example, prior to impregnating the fiber-reinforcement 44 and its fibers 46 with respective thermoplastic matrix 42A, 42B (generally referred to as "42"), the fibers 46 may be subject to a treatment; e.g., a surface treatment. Examples of the treatment include, but are not limited to, a heat treatment and a coating process. Of course, it is contemplated the electrical conductivity of the fibers 46 may also or alternatively be tailored by selecting different fiber materials (e.g., different types of carbon) with different electrical conductivities for different fibers 46.

Figure 6A:
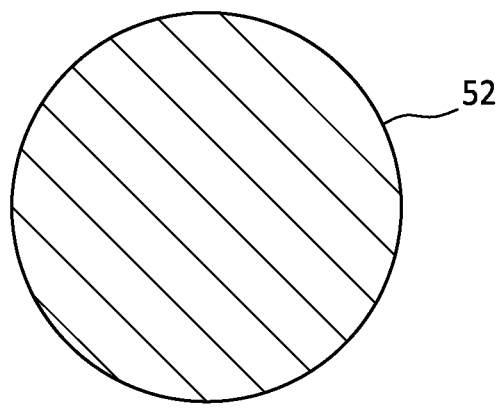
FIGS. 6A and 6B are cross-sectional illustrations at various stages during treatment of a carbon fiber.
Figure 6B:
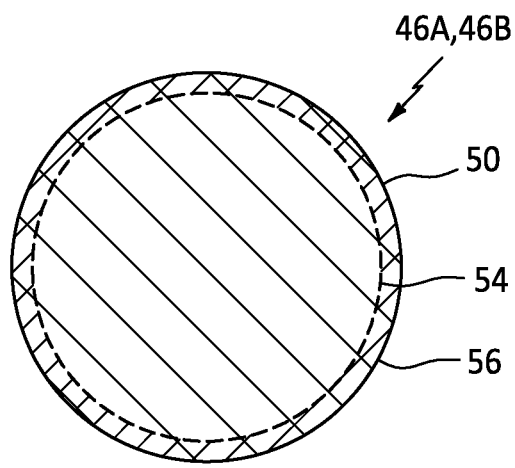
Figure 7:
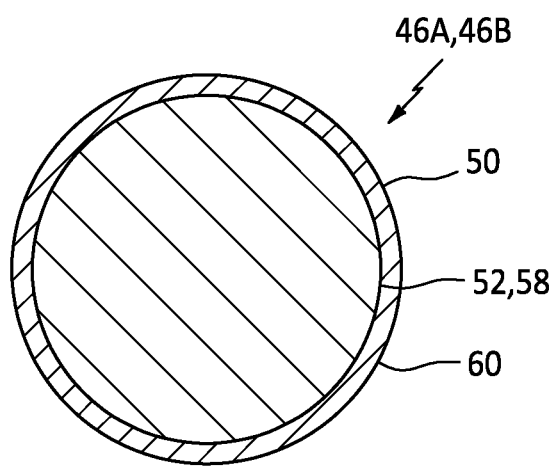
FIG. 7 is a cross-sectional illustration of a coated carbon fiber.

During the heat treatment, the fibers 46 may be heated at an elevated temperature for a period of time within a gaseous environment or within a vacuum. This heating may modify material of each fiber 46 at a surface 50 of the respective fiber 46 (see FIGS. 6B and 7). For example, prior to the heat treatment, the fiber of FIG. 6A has a solid body 52 made from a fiber material; e.g., a carbon material. However, following the heat treatment, the fiber 46 of FIG. 6B has a solid fiber core 54 and a fiber shell 56 at least partially or completely surrounding (e.g., circumscribing) the fiber core 54. Here, the fiber core 54 may still be constructed from the original fiber material—the fiber material of FIG. 6A. A structure and/or a composition of the fiber shell 56, however, may be modified to be different than the fiber material of the fiber core 54 by the heat treatment. Thus, the fiber shell 56 (post heat treatment) has a different configuration (e.g., structure and/or composition) than the fiber core 54 it surrounds. By adjusting the temperature and/or the period of time of the heat treatment, the electrical conductivity of the fiber 46 may be changed and tailored which is based on the specific structure and/or composition of the fiber shell 56, for example. Thus, by heat treating common fibers (e.g., the same type and/or composition of fibers) at different temperatures and/or for different periods of time, those fibers may be respectively modified to form the first fibers 46A and the second fibers 46B with different electrical conductivities. Note, while the electrical conductivities of the fiber shells 56 of the fibers 46 may be different, the electrical conductivities of the fiber cores 54 of the fibers 46 may remain the same.

During the coating process, the fibers may be coated with different materials and/or different quantities of the materials to provide different fibers 46A and 46B with different electrical conductivities. For example, following the coating process, the fiber 46 of FIG. 7 includes a fiber core 58 (e.g., the original fiber) and a fiber shell 60 (e.g., a coating) at least partially or completely surrounding (e.g., circumscribing) the fiber core 58.

Figure 8:
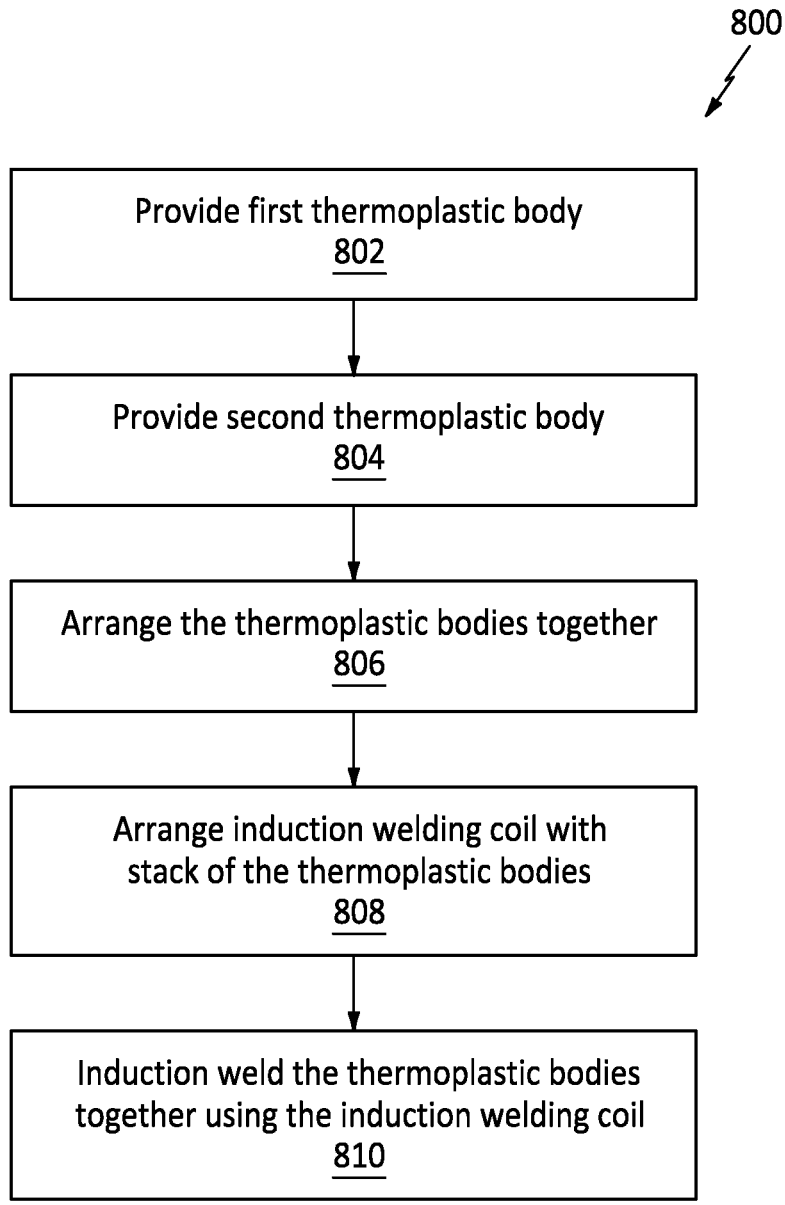
FIG. 8 is a flow diagram of a method for manufacturing a thermoplastic component.

FIG. 8 is a flow diagram of a method 800 for manufacturing a thermoplastic component; e.g., a thermoplastic composite component/a fiber-reinforced thermoplastic component. For ease of description, this manufacturing method 800 is described below with respect to the aircraft component 20 described above. The manufacturing method 800 of the present disclosure, however, is not limited to such exemplary component arrangements.

In step 802, the first thermoplastic body 38A is provided. For example, the first fiber-reinforcement 44A and its first fibers 46A may be configured with their first electrical conductivities as described above, or otherwise. The first fiber-reinforcement 44A and its first fibers 46A may then be impregnated with the first thermoplastic material to form the first thermoplastic body 38A (e.g., via injection molding, lamination, etc.). Alternatively, the first fiber-reinforcement 44A and its first fibers 46A may be impregnated with the first thermoplastic material to form stock material (e.g., thermoplastic prepreg material), which stock material is subsequently cut (e.g., trimmed), laid up and/or shaped (e.g., stamp formed, molded, etc.) to provide the first thermoplastic body 38A.

In step 804, the second thermoplastic body 38B is provided. For example, the second fiber-reinforcement 44B and its second fibers 46B may be configured with their second electrical conductivities as described above, or otherwise. The second fiber-reinforcement 44B and its second fibers 46B may then be impregnated with the second thermoplastic material to form the second thermoplastic body 38B (e.g., via injection molding, lamination, etc.). Alternatively, the second fiber-reinforcement 44B and its second fibers 46B may be impregnated with the second thermoplastic material to form stock material (e.g., thermoplastic prepreg material), which stock material is subsequently cut (e.g., trimmed), laid up and/or shaped (e.g., stamp formed, molded, etc.) to provide the second thermoplastic body 38B.

Figure 9:
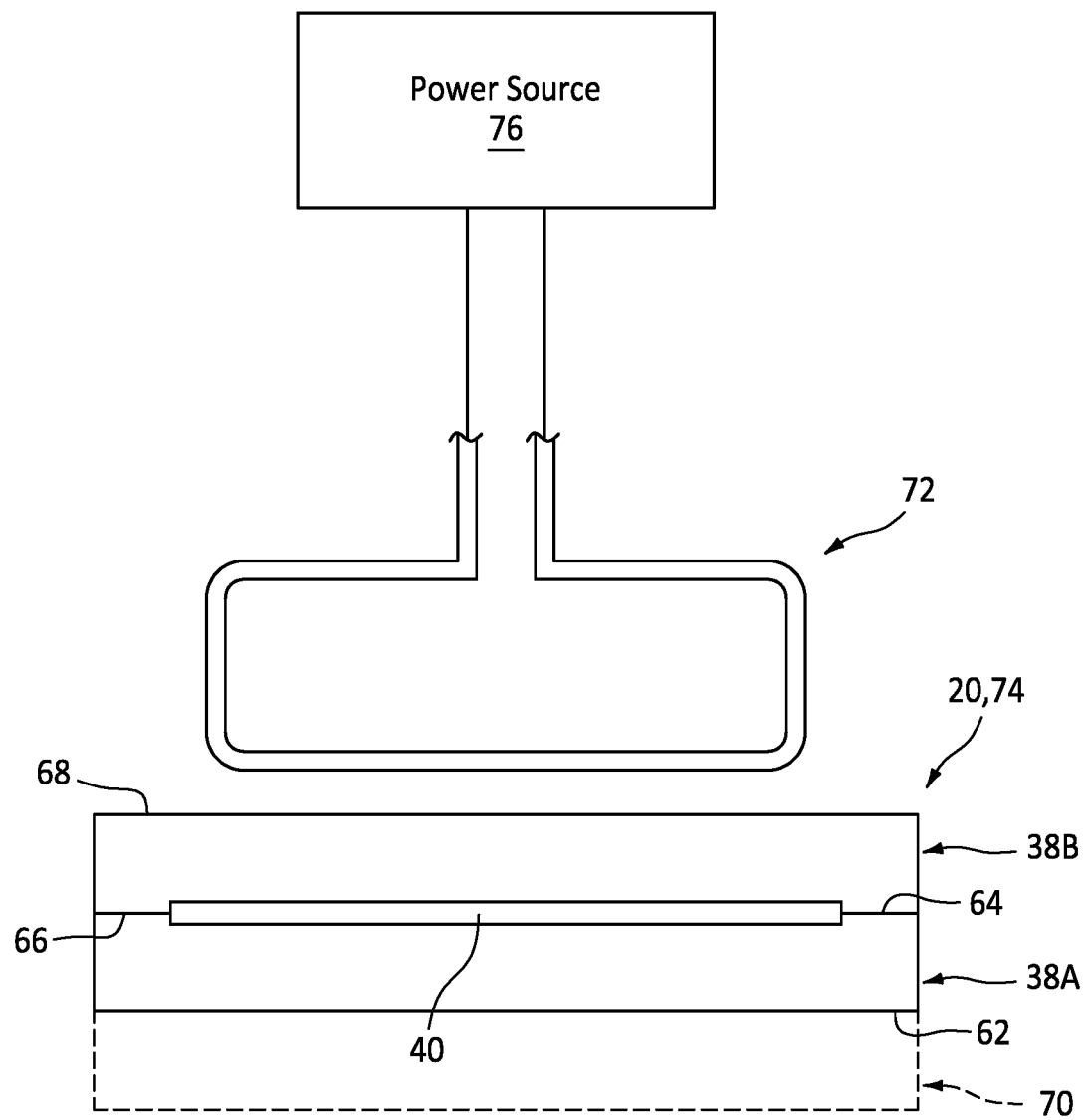
FIG. 9 is a partial schematic sectional illustration of a system for induction welding a stack of thermoplastic bodies together using an induction welding coil.

In step 806, the second thermoplastic body 38B is arranged with the first thermoplastic body 38A for induction welding together. For example, the second thermoplastic body 38B of FIG. 9 is disposed on the first thermoplastic body 38A. The first thermoplastic body 38A of FIG. 9 has a first body thickness that extends vertically between and to a first (e.g., lower) surface 62 of the first thermoplastic body 38A and a second (e.g., upper) surface 64 of the first thermoplastic body 38A. The second thermoplastic body 38B of FIG. 9 has a second body thickness that extends vertically between and to a first (e.g., lower) surface 66 of the second thermoplastic body 38B and a second (e.g., upper) surface 68 of the second thermoplastic body 38B. The second body first surface 66 of FIG. 9 is abutted against and contacts the first body second surface 64. The second body first surface 66, for example, may lay against (e.g., rest on, be disposed in full contact with, be disposed flat against, etc.) the first body second surface 64.

While the surfaces 64 and 66 are shown with straight-line sectional geometries in the plane of FIG. 9, it is contemplated the surfaces 64 and 66 may alternatively have non-straight-line (e.g., curved, compound, etc.) sectional geometries in the plane of FIG. 9. Moreover, the surfaces 64 and 66 may also or alternatively have straight-line or non-straight-line sectional geometries in a plane perpendicular to the plane of FIG. 9. For example, the surfaces 64 and 66 may be flat, planar surfaces, two-dimensional (2D) curved or otherwise non-flat surfaces, or three-dimensional (3D) curved or otherwise non-flat surfaces.

In some embodiments, the first thermoplastic body 38A may be supported on/by another body 70, where the first thermoplastic body 38A is vertically between the second thermoplastic body 38B and the other body 70. This other body 70 may be a rigid support structure; e.g., a processing table. The other body 70 may alternatively be another thermoplastic element induction welded and/or otherwise attached to (or formed integral with) the first thermoplastic body 38A. In other embodiments, the first thermoplastic body 38A may be self-supported without, for example, use of any fixtures or frames (e.g., directly) engaging and/or below the first thermoplastic body 38A; e.g., the other body 70 may be omitted.

In step 808, an induction welding coil 72 is arranged with a stack 74 of the thermoplastic bodies 38. The induction welding coil 72, for example, may be disposed over and slightly spaced from) the stack 74 and its second thermoplastic body 38B. Here, the second thermoplastic body 38B is disposed vertically between the first thermoplastic body 38A and the induction welding coil 72. The induction welding coil 72 of FIG. 9 is electrically coupled to a power source 76.

In step 810, the thermoplastic bodies 38 of FIG. 9 are induction welded together using (e.g., only) the induction welding coil 72; e.g., without any other heating devices such as other electric heater(s), an oven, an autoclave, etc. The power source 76, for example, may provide a high frequency (e.g., alternating) current to the induction welding coil 72. The induction welding coil 72 may subsequently generate electromagnetic waves which concurrently excite (a) at least some (or all) of the first fibers 46A (see FIG. 4) within the first thermoplastic body 38A and/or (b) at least some (or all) of the second fibers 46B (see FIG. 5) within the second thermoplastic body 38B. The fibers 46 are excited by eddy currents propagated within the thermoplastic bodies 38. The excitation of the fibers 46 may elevate a temperature of each thermoplastic body 38 to a melting point temperature of its thermoplastic matrix 42 (see FIGS. 4 and 5) such that the thermoplastic matrix 42 of each thermoplastic body 38 melts. A melt layer may form at an interface laterally aligned with the induction welding coil 72 between the thermoplastic bodies 38. This melt layer welds the thermoplastic bodies 38 together upon cooling thereof at a respective weld location 40.

Figure 10:
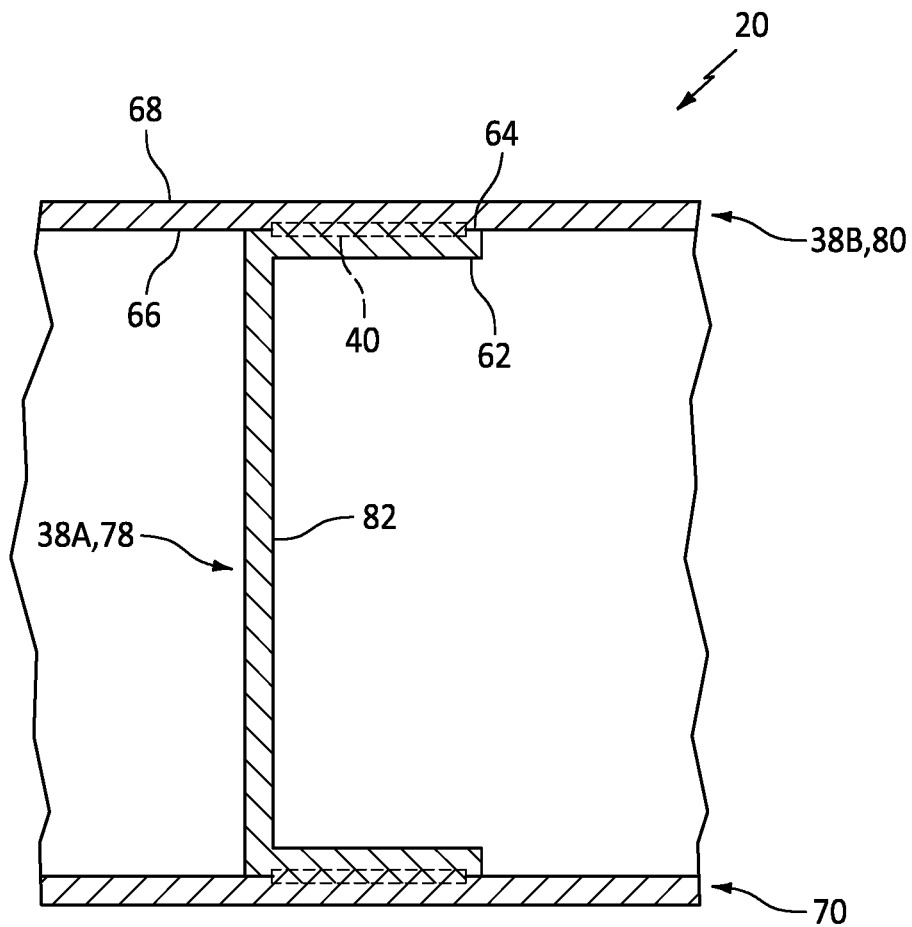
FIG. 10 is a partial sectional illustration of another aircraft component.

During the induction welding, the first thermoplastic body 38A and the second thermoplastic body 38B are differentially heated by the induction welding coil 72. For example, the eddy currents may excite the second fiber-reinforcement 44B and its second fibers 46B more than the first fiber-reinforcement 44A and its first fibers 46A since the second electrical conductivity is greater than the first electrical conductivity. Thus, while the thermoplastic matrices 42 in both thermoplastic bodies 38 melt along the interface, more of the second thermoplastic matrix 42B melts than the first thermoplastic matrix 42A. Moreover, more of the second thermoplastic matrix 42B surrounding the interface softens than the first thermoplastic matrix 42A surrounding the interface. This may be particularly useful where the first thermoplastic body 38A may not readily be supported during the induction welding. For example, referring to FIG. 10, where the first thermoplastic body 38A is configured as a support structure 78 (e.g., a rib, a rail, a frame, etc.) and the second thermoplastic body 38B is configured as a skin 80, the skin 80 may be induction welded to the support structure 78 without compromising the integrity and/or a shape of the support structure 78, for example. For example, if the support structure 78 is subject to increased heating, a web 82 of the support structure 78 may deform; e.g., particularly where the skin 80 is pressed against the support structure 78 for the induction welding. Thus, the electrical conductivity of the fiber-reinforcement 44 and its fibers 46 may be tailored to reduce or eliminate heat related deformation during the induction welding.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method, comprising:
   providing a first thermoplastic body, the first thermoplastic body comprising first fiber-reinforcement with a first electrical conductivity, the first fiber-reinforcement comprising a plurality of first fibers, and one of the plurality of first fibers including a first core and a first shell over the first core;
   providing a second thermoplastic body, the second thermoplastic body comprising second fiber-reinforcement with a second electrical conductivity that is greater than the first electrical conductivity, the second fiber-reinforcement comprising a plurality of second fibers, one of the plurality of second fibers including a second core and a second shell over the second core, and the second shell having a greater electrical conductivity than the first shell;
   arranging the second thermoplastic body with the first thermoplastic body; and
   induction welding the second thermoplastic body to the first thermoplastic body using an induction welding coil, the second thermoplastic body arranged between the first thermoplastic body and the induction welding coil.

2. The method of claim 1, wherein the second core and the first core have a common electrical conductivity.

3. The method of claim 1, wherein the second core and the first core comprises a common material.

4. The method of claim 1, wherein the induction welding comprises exciting the plurality of first fibers of the first fiber-reinforcement and the plurality of second fibers of the second fiber-reinforcement with eddy currents generated by the induction welding coil.

5. The method of claim 1, wherein
   the first thermoplastic body is configured as a support structure;
   the second thermoplastic body is configured as a skin; and
   the skin is supported by and welded to the support structure following the induction welding.

6. The method of claim 1, further comprising:
   forming an aircraft component;
   the aircraft component including the second thermoplastic body induction welded to the first thermoplastic body.

7. A method, comprising:
   treating a plurality of first fibers with a first treatment to provide first fiber-reinforcement with a first electrical conductivity;
   providing a first thermoplastic body, the first thermoplastic body comprising the first fiber-reinforcement with the first electrical conductivity, and the providing of the first thermoplastic body comprising embedding the first fiber-reinforcement within a first thermoplastic matrix;
   treating a plurality of second fibers with a second treatment to provide the a second fiber-reinforcement with a second electrical conductivity, the second treatment different than the first treatment;
   providing a second thermoplastic body, the second thermoplastic body comprising the second fiber-reinforcement with the second electrical conductivity that is greater than the first electrical conductivity, and the providing of the second thermoplastic body comprising embedding the second fiber-reinforcement within a second thermoplastic matrix;
   arranging the second thermoplastic body with the first thermoplastic body; and
   induction welding the second thermoplastic body to the first thermoplastic body using an induction welding coil, the second thermoplastic body arranged between the first thermoplastic body and the induction welding coil.

8. The method of claim 7, wherein the plurality of first fibers and the plurality of second fibers are formed by a common material.

9. The method of claim 7, wherein
   the first treatment comprises heating the plurality of first fibers at a first elevated temperature for a first period of time;
   the second treatment comprises heating the plurality of second fibers at a second elevated temperature for a second period of time; and
   at least one of
      the first elevated temperature is different than the second elevated temperature; or
      the first period of time is different than the second period of time.

10. The method of claim 7, wherein
    the first treatment comprises coating the plurality of first fibers with a first material; and
    the second treatment comprises coating the plurality of second fibers with a second material that is different than the first material.

11. The method of claim 7, wherein the induction welding comprises exciting the plurality of first fibers of the first fiber-reinforcement and the plurality of second fibers of the second fiber-reinforcement with eddy currents generated by the induction welding coil.

12. The method of claim 7, wherein
    the first thermoplastic body is configured as a support structure;
    the second thermoplastic body is configured as a skin; and
    the skin is supported by and welded to the support structure following the induction welding.

13. The method of claim 7, further comprising:
    forming an aircraft component;
    the aircraft component including the second thermoplastic body induction welded to the first thermoplastic body.

14. A method, comprising:
    providing a plurality of carbon fibers formed from a common carbon material;
    treating a first set of the plurality of carbon fibers with a first treatment to provide a plurality of first fibers with a first electrical conductivity;
    providing a first thermoplastic body, the providing of the first thermoplastic body comprising embedding the plurality of first fibers within a first thermoplastic matrix;
    treating a second set of the plurality of carbon fibers with a second treatment to provide a plurality of second fibers with a second electrical conductivity which is different than the first electrical conductivity;
    providing a second thermoplastic body, the providing of the second thermoplastic body comprising embedding the plurality of second fibers within a second thermoplastic matrix; and induction welding the second thermoplastic body to the first thermoplastic body using an induction welding coil.

\* \* \* \* \*